ance

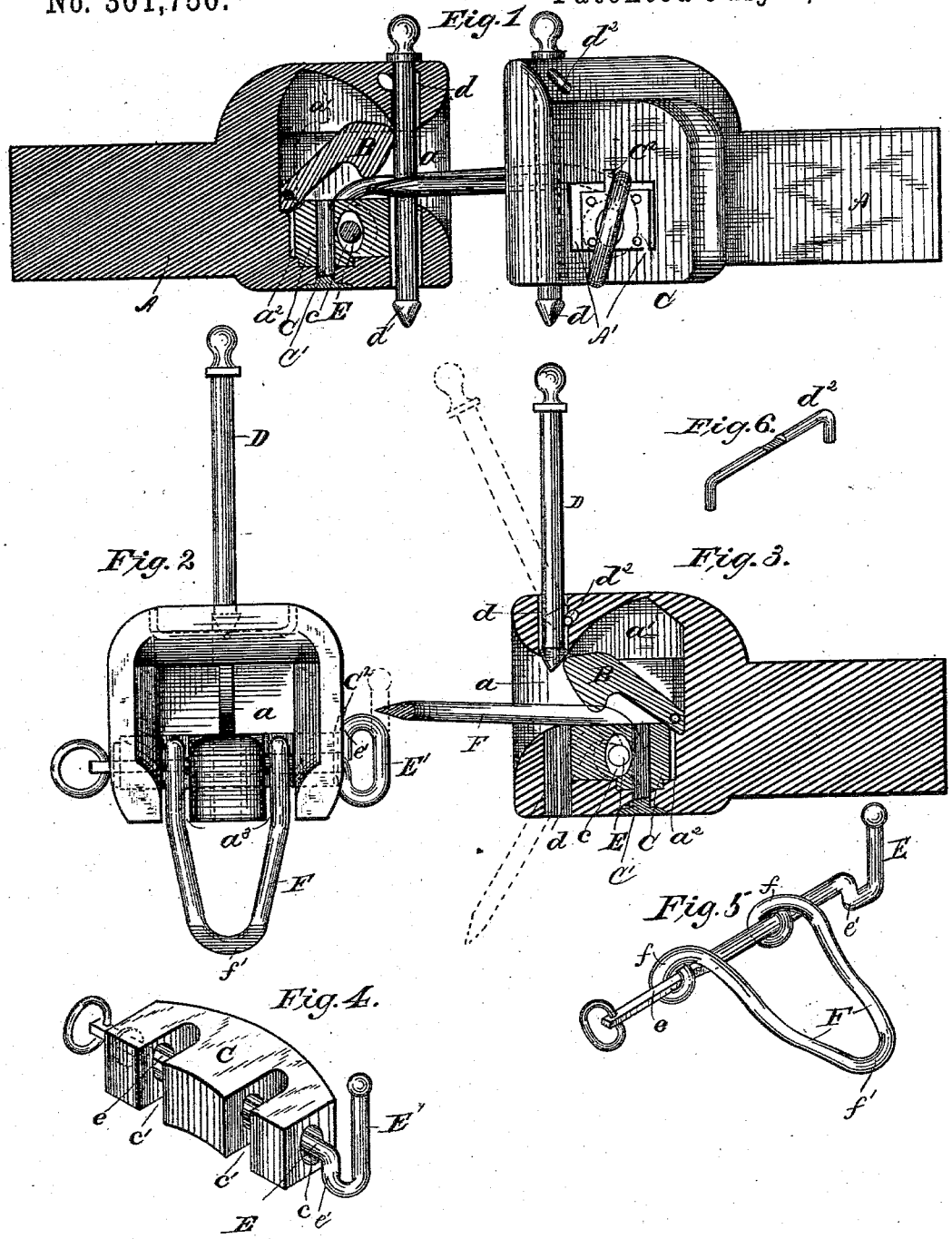

UNITED STATES PATENT OFFICE.

HENRY LEVI PECK, OF NEWARK, OHIO.

CAR-COUPLING.

SPECIFICATION forming part of Letters Patent No. 301,750, dated July 8, 1884.

Application filed May 1, 1884. (No model.)

*To all whom it may concern:*

Be it known that I, HENRY LEVI PECK, a citizen of the United States, residing at Newark, in the county of Licking and State of Ohio, have invented certain new and useful Improvements in Car-Couplers; and I do hereby declare the following to be a full, clear, and exact description of the invention, such as will enable others skilled in the art to which it appertains to make and use the same.

This invention relates to that class of car-couplers in which a gravitating coupling-link is permanently pivoted to each draw-head.

The object of the invention is to provide for the double coupling of cars, whereby each link is relieved of half the ordinary pulling strain, and the strength of the coupling increased twofold. A further object is to prevent the loss or misplacement of coupling links and pins. A further object is to provide a means by which the coupling-links, when raised to enter the mouth of an opposite draw-head, may be automatically retained in their horizontal position and automatically released at the desired time.

To this end the invention consists in novel features and combinations, which will be fully described in the ensuing specification, and claimed in the clauses at the close thereof.

In the accompanying drawings, Figure 1 is a side elevation of two draw-heads connected by my improved coupler, one of said draw-heads being shown in vertical section. Fig. 2 is an end elevation, looking toward the front, of a draw-head provided with my improvements. Fig. 3 is a vertical section showing the link and coupling-pin elevated, the latter being supported by the trip block or dog. Fig. 4 is a perspective of the bearing-block and link-operating shaft. Fig. 5 is a perspective view of the link secured to its shaft. Fig. 6 is a perspective view of the pin-retaining rod.

The same letters of reference indicate identical parts in all the figures.

The draw-head A is substantially similar to those now in common use, the mouth $a$ being, however, provided at the rear with upper and lower chambers, $a'$ and $a^2$, the upper one, $a'$— for the reception of the gravitating trip block or dog B, and the lower one for the reception of the pivoted bearing-block C.

Near the front of the mouth $a$ is the customary hole, $d$, for the reception of the coupling-pin D, which is provided at its lower end with a swell or enlargement, $d'$. A rod, $d^2$, one side of which is cut away at the center, as shown in Fig. 6, is seated in an aperture intersecting one side of the pin-hole $d$ at its upper end, the relations of the parts being such that when the pin D is drawn up to the full limit of its movement the supporting-rod $d^2$ may be turned with its rounded side toward the pin, so that the enlarged end $d'$ of the pin will rest upon said rod $d^2$, and upon said rod $d^2$ being turned in the proper direction its cut-away portion will be brought next the pin, thus permitting the pin to drop.

As trip blocks or dogs similar to that shown at B are well known in structures of this class, there is no need to give a particular description of its operation. I would state, however, that the dog shown is provided at its rear end with an extension, which, coming in contact with the rear wall of the mouth $a$ of the coupler, (or other suitable abutment,) will prevent the front or free end of the dog from falling below a predetermined point, thus insuring its satisfactory operation under all circumstances. The bearing-block C is seated in the lower chamber, $a^2$, of the draw-head, and is mounted upon a vertical pivot-bolt, C', as shown in Figs. 1 and 3. The ends of this block project through elongated horizontal apertures A' in the sides of the draw-head, said apertures A' being of such size as to permit the projecting ends of the bearing-block to move freely forward and back in a circular path. The bearing-block, which is of the form best shown in Fig. 4, is provided with an aperture, $c$, elliptical in cross-section, which forms a bearing for the lifting-shaft E. This shaft is constructed with angular faces $e$ upon one end, and secured to it are the ends $f$ of the link F, one of said ends being formed to fit the angular portion $e$ of the shaft, in order that the partial rotation of the shaft will raise the free or loop end $f'$ of the link from the hanging position shown in Fig. 2 to the horizontal position shown in Fig. 3. The bearing-block is provided at its front side with two deep grooves, $c'$, for the reception of the ends $f$ of the link, and in the lower lip of the mouth $a$ of the draw-head are formed corresponding grooves, $a^3$. (See Fig. 2.) These grooves $a^3$ are provided in order to permit the link F to drop to a nearly-vertical position, so that when not in use it will not project beyond the end of the draw-head, thus lessening the liability of damage from coming in contact with another draw-head or other object. The free end $f'$ of the link is beveled, in order that two links approaching in the same horizontal plane, in the act of coupling, may ride past each other and not be injured by the contact. The shaft E has a slight longitudinal movement in bearing-block C, to enable a projection, $e'$, (shown in the drawings as forming a part of the handle E',) to be engaged by or freed from a fixed keeper, $C^2$, on one or both ends of the bearing-block C, in order that the link F may be sustained in an elevated position for coupling or permitted to fall.

By reason of the relative construction of the pivoted bearing-block and the recess in which it is pivoted, the free end of the link is given sufficient lateral play to prevent cramping or strain, which would otherwise be caused by traveling curves or the ordinary swaying of the cars; and, in consequence of the vertical cross-sectional elongation of the bearing $c$ of the shaft E, torsional strain on the link is also avoided.

To couple with the couplers herein described the coupling-pins D are raised high enough to be supported by the dog B, the lifting-shafts E rotated to raise the links F to a longitudinal position, and then slid longitudinally, in order that the projection $e'$ may engage the keeper $C^2$, to prevent the free end of the link from falling. As the cars approach each other, the free ends $f'$ of the respective links will enter the mouth of the opposite draw-head, and by tripping the dogs B cause the respective coupling-pins D to fall and pass through the link of the opposite draw-head, thus automatically effecting the double coupling of the cars. It will be understood, of course, that the ordinary coupling-links may be used with these draw-heads, if occasion requires, and also that the free end $f'$ of my coupling-links may be received in the ordinary draw-head and retained by the usual coupling-pin.

To those familiar with the art will be suggested many modifications, (as, for instance, a movable keeper might be used in connection with a lifting-shaft which is capable of rotation but fixed longitudinally,) which, fairly considered, are within the scope of my invention.

It may be remarked that the lifting-shaft E is also a guide for the link in coupling, as by moving the handle E' forward or back the bearing-block will be moved on its pivot, and the free end $f'$ of the link moved either to the right or left of the vertical center of the draw-head.

What I claim as my invention is—

1. The combination, substantially as before set forth, of a pair of draw-heads, a transverse lifting-shaft for each draw-head, a gravitating U-shaped link rigidly secured to said shaft, and a coupling-pin for each draw-head, whereby the draw-heads may be doubly coupled.

2. In a car-coupler, the combination, substantially as before set forth, of the draw-head, the bearing-block pivoted within the mouth of the draw-head, the transverse lifting-shaft journaled in said bearing-block, and the gravitating link having its ends secured to said shaft within the mouth of the draw-head.

3. The combination, substantially as before set forth, of the draw-head having a single mouth and grooved lower lip, the grooved bearing-block, the lifting-shaft, and the link.

4. The combination, substantially as before set forth, of the draw-head, the keeper, the link, and the transverse lifting-shaft provided with a projection, and adapted to slide longitudinally in its bearings.

5. The combination, substantially as before set forth, of the draw-head, the coupling-pin, the pivoted dog, the link, the transverse lifting-shaft provided with a projection, and the keeper.

6. The combination, substantially as before set forth, of the draw-head, the pivoted bearing-block, provided with a bearing vertically elongated in cross-section, the lifting-shaft, and the link.

In testimony whereof I affix my signature in presence of two witnesses.

HENRY LEVI PECK.

Witnesses:
GEORGE P. WEBB,
C. M. WILSON.